United States Patent [19]

Tzeng

[11] Patent Number: 5,303,228

[45] Date of Patent: Apr. 12, 1994

[54] A FAR-END ECHO CANCELLER WITH A DIGITAL FILTER FOR SIMULATING A FAR END ECHO CONTAINING A FREQUENCY OFFSET

[75] Inventor: Chin-Pyng J. Tzeng, Hsinchu, Taiwan

[73] Assignee: Industrial Technology Research Institute, Hsinchu, Taiwan

[21] Appl. No.: 750,642

[22] Filed: Aug. 27, 1991

[51] Int. Cl.⁵ ............................................. H04J 15/00
[52] U.S. Cl. ................................. 370/32.1; 375/118; 379/411
[58] Field of Search ................. 370/32.1, 32; 379/406, 379/410, 411; 364/724.19; 333/18; 455/79

[56] References Cited

U.S. PATENT DOCUMENTS

| | | | |
|---|---|---|---|
| 4,646,173 | 2/1987 | Kammeyer et al. | 375/118 |
| 4,786,884 | 11/1988 | Wouda et al. | 379/411 |
| 4,813,073 | 3/1989 | Ling | 379/410 |
| 5,084,866 | 1/1992 | Buttle | 379/411 |
| 5,189,664 | 2/1993 | Cheng | 370/32.1 |

Primary Examiner—Douglas W. Olms
Assistant Examiner—Shick Hom
Attorney, Agent, or Firm—Meltzer, Lippe, Goldstein, et al.

[57] ABSTRACT

A far-end echo path may be simulated at a terminal which utilizes QAM by processing the in-phase and quadrature data symbols by a pulse shaping filter whose transfer function may be a raised cosine function. The in-phase and quadrature data symbols are then multiplied by $\cos(\omega_c+\omega_o)t$ and $\sin(\omega_c+\omega_o)t$, respectively, where $\omega_c$ is the carrier frequency and $\omega_o$ is the adaptively determined offset frequency of the far-end echo signal. The output signals of the multipliers are then summed and the result is processed by a single transversal filter whose transfer function is determined adaptively. The output of this filter is a simulated far-end echo signal.

8 Claims, 5 Drawing Sheets

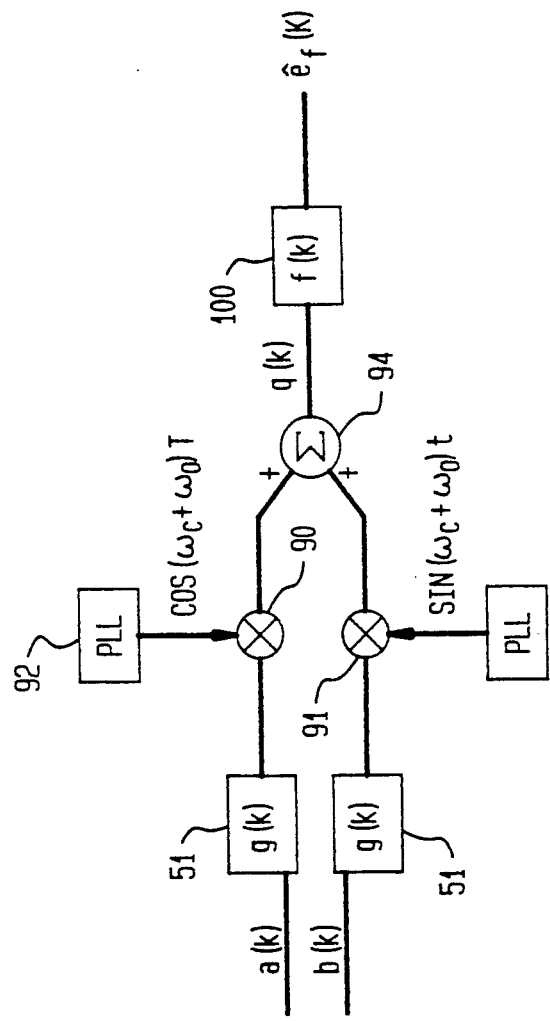

A FAR-END ECHO CANCELLER WITH A DIGITAL FILTER FOR SIMULATING A FAR END ECHO CONTAINING A FREQUENCY OFFSET

FIELD OF THE INVENTION

The present invention relates to a data transmission system including an echo canceller. More particularly, the present invention relates to a far-end echo canceller for use in a system in which the far-end echo contains a frequency offset.

BACKGROUND OF THE INVENTION

In a typical full duplex data communication system, a local terminal simultaneously transmits data to and receives data from a remote terminal via a communication channel which is formed at least in part by a two-wire telephone line. A hybrid coupler is located at each end of the channel for the purpose of isolating the incoming and outgoing signals. Because the hybrid couplers operate imperfectly, the outgoing signal of the local terminal may be partially reflected at the local hybrid coupler in the form of a near-end echo and partially reflected at the remote hybrid coupler in the form of a far-end echo. Both echoes corrupt the incoming signal of the local terminal.

The near-end echo is generally identical in carrier frequency to the local outgoing signal. It can therefore be eliminated easily by a conventional near-end echo canceller. The near-end echo canceller comprises an adaptive linear transversal filter that simulates the transfer function of the near-end echo path that produced the near-end echo. The outgoing signal is processed by the near-end echo canceller to generate a simulated near-end echo signal. The simulated near-end echo signal is then subtracted from the incoming signal which is corrupted with the near-end echo.

Correcting the far-end echo is not as simple because the far-end echo may have a continually shifting phase, for example, in the form of a frequency offset, relative to the original outgoing signal. This may be caused by small differences between the carrier frequency of the outgoing signal and the carrier frequency of the far-end echo signal that occur when circuits used to step up and step down the signal carrier frequency are not perfectly matched. This is the case when the communications channel between the local data terminal and the remote data terminal includes a satellite hop. Because of the non-linearity in the far-end echo transfer function as represented by the changing phase, a far-end echo canceller in the form of a linear transversal filter is unable to adequately simulate the far-end echo transfer function (see, e.g., Ling, U.S. Pat. No. 4,813,073).

Thus, conventional far-end echo cancelers are quite complex. For example, in the case where Quadrature Amplitude Modulation (QAM) is utilized to modulate the data symbols onto a carrier frequency of $\omega_c/2\pi$, a conventional far-end echo canceller for simulating a far-end echo path comprises four transversal filters, followed by two summers, followed by two multipliers, followed by another summer. The disadvantage of this far-end echo canceller is that it is very complex.

Accordingly, it is an object of the present invention to provide a far-end echo canceller for use in a system where the far-end echo signal system has a frequency offset, which echo canceller is simpler in construction than the above-described conventional echo canceller. Furthermore, it is an object of the present invention to provide a far-end echo canceller which is of simple construction for a communication system which utilizes QAM.

SUMMARY OF THE INVENTION

In accordance with an illustrative embodiment of the present invention, a far-end echo path may be simulated at a terminal which utilizes QAM by processing the in-phase and quadrature data symbols by a pulse shaping filter whose transfer function is, for example, a raised cosine function. The in-phase and quadrature data symbol are then multiplied by $\cos(\omega_c+\omega_o)t$ and $\sin(\omega_c+\omega_o)t$, respectively, where $\omega_c$ is the carrier frequency utilized by the QAM and $\omega_o$ is the offset frequency which is determined by a phase lock loop adaptively. The output signals from the multipliers are then summed using a summer and the summed signal is then processed by a transversal filter having a real transfer function which is adaptively determined. The output of this filter is a simulated far-end echo signal.

Because the pulse shaping filter is typically incorporated into the transmitter, the echo canceller may be implemented using only two multipliers, one summer and one transversal filter. This is much simpler than the conventional far-end echo canceller described above.

BRIEF DESCRIPTION OF THE DRAWING

FIG. 4 illustrates a far-end echo canceller for use in the system of FIG. 1, in accordance with an embodiment of the present invention.

DETAILED DESCRIPTION OF THE INVENTION

Figure 1:
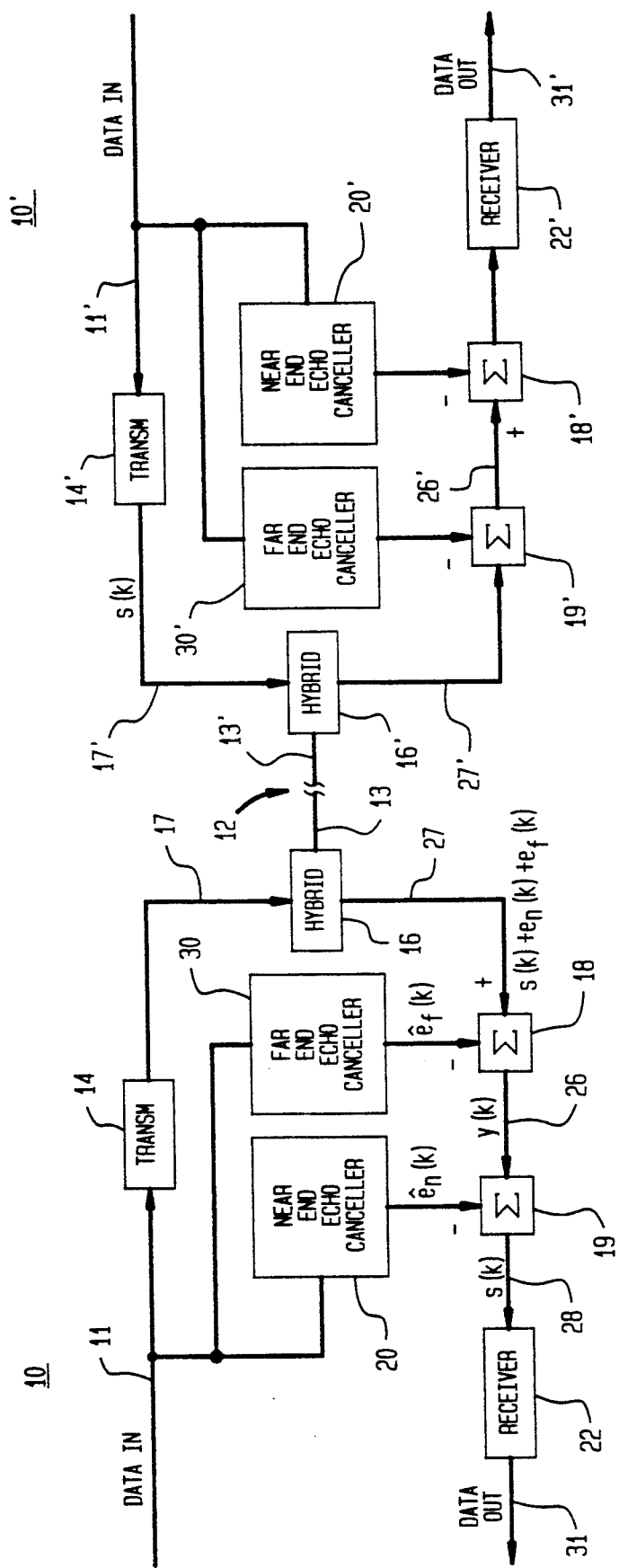
FIG. 1 schematically illustrates a communication system including a far-end echo canceller.

FIG. 1 schematically illustrates a communication system 1. The system comprises a local terminal 10 and a remote terminal 10'. The local terminal 10 transmits data to and receives data from the remote terminal 10' via communications channel 12. The channel 12 is formed in part by a two-wire telephone line. However, portions of the channel 12 may be formed by other communications media such as a satellite hop.

Data symbols to be transmitted from the terminal 10 arrive at a transmitter 14 via line 11. At the transmitter 14, the data symbols are modulated into a carrier using, for example, Quadrature Amplitude Modulation. The modulated carrier signal is then routed to a hybrid coupler 16 via line 17. The hybrid coupler 16 routes the modulated carrier signal to a two wire line 13 which forms part of the communications channel 12.

Similarly, at the remote terminal 10', a transmitter 14' receives data symbols via line 11' and modulates the symbols onto a carrier. The modulated carrier is then delivered to a hybrid coupler 16' via line 17'. The hybrid coupler 16' then routes the modulated carrier signal onto a two-wire line 13' which forms part of the channel 12. Thus the two-wire lines 13 and 13' each carry both an outgoing modulated signal and an incoming modulated signal.

At the local terminal 10, the hybrid 16 routes the incoming signal on the two-wire line 13 to the summers 18 and 19 and the receiver 22 via the line 27. Similarly, at the remote terminal 10', the hybrid 16' routes the incoming signal on the two-wire line 13' to the summers 18' and 19' and the receiver 22' via the line 27'. The summers 18, 19 and 18', 19' are utilized for echo cancellation in a manner described below. After echo cancellation, the receivers 22 and 22' demodulate the received modulated carrier signal to provide output data symbols on the lines 31 and 31', respectively.

Because of imperfections such as impedance mismatches in the hybrids 16 and 16', echoes are generated in the system 1 of FIG. 1. Thus, a portion of the outgoing modulated carrier on line 17 of the terminal 10 is actually transmitted by the hybrid 16 to the line 27 rather than to the two-wire line 13. Similarly, a portion of this same signal originating in the terminal 10 is reflected at the hybrid 16' back onto the two-wire line 13'. Thus, the incoming modulated signal on the line 27 in the terminal 10 comprises the incoming signal s(k) generated by the transmitter 14' in the terminal 10', a near-end echo $e_n(k)$ generated by the hybrid 16 imperfectly coupling the signal generated by the transmitter 14 to the two-wire line 13, and a far-end echo $e_f(k)$, resulting from imperfect coupling of the incoming signal on the two-wire line 13' by the hybrid 16' into the line 27'.

To eliminate the near-end echo $e_n(k)$ and the far-end echo $e_f(k)$, the terminal 10 includes a near-end echo canceller 20 and a far-end echo canceller 30. The near-end echo canceller 20 generates a signal $ê_n(k)$ which is a simulation of the near-end echo signal $e_n(k)$. The far-end echo canceller 30 generates a signal $ê_f(k)$ which is a simulation of the far-end echo signal $e_f(k)$. The summer 18 is utilized to subtract $ê_f(k)$ from the signal on line 27 to produce a signal on line 26 $y(k)=s(k)+e_n(k)$. The summer 19 is utilized to subtract $ê_n(k)$ from y(k) to produce the signal s(k) on line 28.

It should be noted that the signal on line 27' of the remote terminal 10' is also corrupted by near-end and far-end echoes. To cancel these echoes the remote terminal 10' also includes a far-end echo canceller 30' which is identical to the far-end echo canceller 30 and a near-end echo canceller 20' which is identical to the near-end echo canceller 20.

As indicated above, the near-end echo is generally identical in carrier frequency to the local outgoing signal. For this reason, the near-end echo canceller 20 comprises a linear transversal filter that simulates the transfer function of the near-end echo path. Cancelling the far-end echo is not as simple because the far-end echo has a frequency offset.

Figure 2:
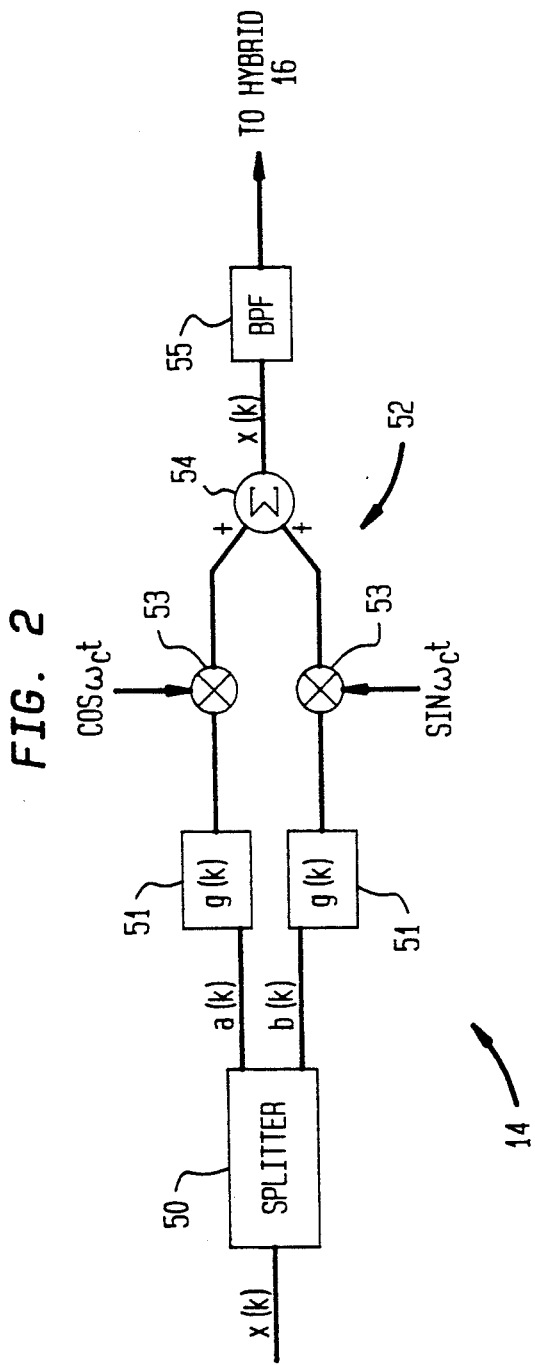
FIG. 2 schematically illustrates a transmitter for use in the communication system of FIG. 1

FIG. 2 illustrates the transmitter 14 in greater detail. The transmitter 14 utilizes Quadrature Amplitude Modulation (QAM). The transmitter 14 receives a sequence of symbols x(k) to be transmitted at the splitter 50. As used herein, k=0,1,2, . . . is a discrete variable corresponding to the times t=kT where T is the sampling interval. The splitter 50 separates the symbols x(k) into in-phase symbols a(k) and quadrature symbols b(k). The symbols a(k) and b(k) are then processed by pulse shaping filters 51 with the transfer function g(k). The filters g(k) are pulse shaping filters which are utilized to limit the frequency spectrum in the frequency domain and to reduce intersymbol interference in the time domain. Illustratively, the transfer function g(k) is a raised cosine function. The QAM modulator 52 comprises two multipliers 53 and one summer 54. The outputs of the modulater 52 is symbol x(k) where $x(k)=a(k) \cos \omega_c t + b(k) \sin \omega_c t$, and where $\omega_c/2\pi$ is the carrier frequency.

The symbol x(k) is transmitted to the pass-band filters 55 and then to the hybrid 16. In some cases the pulse shaping filters 51 may be located following the modulator 52 and before the pass-band filter 55. In addition, an analog-digital converter (not shown) may be included in the transmitter before the pass-band filter 55.

Figure 3:
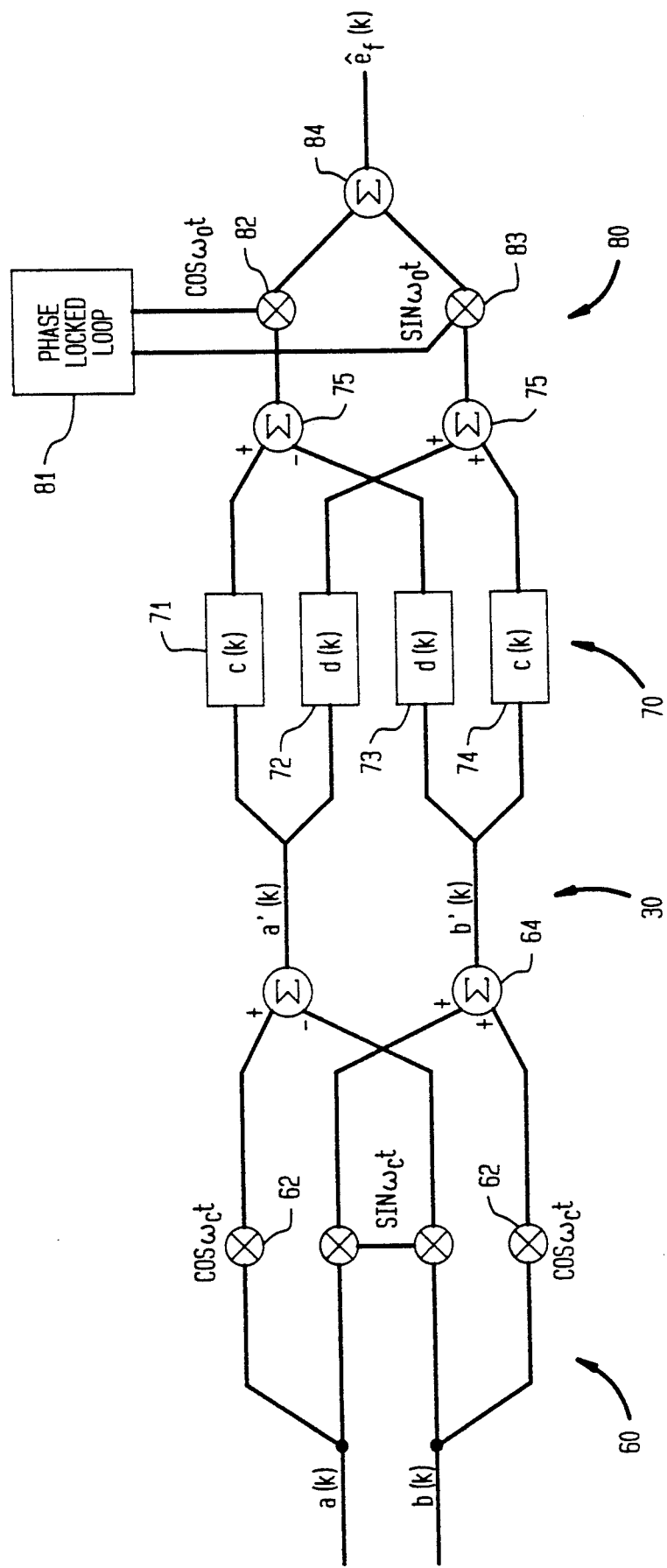
FIG. 3 illustrates a conventional far-end echo canceller for use in the communication system of FIG. 1.

A conventional circuit for simulating the far-end echo path is shown in FIG. 3. This circuit comprises three stages, a first rotator stage 60, a set of cross-coupled transversal filters 70, and a post rotator stage 80. The rotator stage 60 receives the quadrature and in-phase data symbols a(k),b(k) and outputs the symbols a'(k), b'(k). The rotator 60 comprises four multipliers 62 for multiplying a(k) by $\sin \omega_c t$ and $\cos \omega_c t$ and for multiplying b(k) by $\sin \omega_c t$ and $\cos \omega_c t$. The rotator 60 also comprises two summers 64.

The set of transversal filters 70 comprises four cross-coupled linear transversal filters 71, 72, 73, 74 with transfer functions c(k), d(k), d(k), and c(k), respectively. The coefficients of the transfer functions are determined adaptively in a conventional manner. The outputs of the filters 71 and 73 are combined using the summer 75 and the outputs of the filters 72 and 74 are combined using the summer 76.

The rotator 80 is utilized to rotate the signal at the offset frequency $\omega_o/2\pi$. The offset frequency is determined adaptively using a phase-locked loop circuit 81. The multiplier 82 multiplies the output of the summer 75 by $\cos \omega_o t$ and the multiplier 83 multiplies the output of the summer 76 by $\sin \omega_o t$. The output of the multipliers 82 and 83 are added using the summer 84 to produce the simulated far-end echo signal $ê_f(k)$.

The circuit of FIG. 3 may be utilized to implement the far-end echo canceller 30 of FIG. 1. However, this echo canceller is complex, comprising four transversal filters 71, 72, 73, 74, three summers 75, 76, 84, and two multipliers 82, 83.

In accordance with the present invention, the circuit for simulating the far-end echo path can be simplified in comparison to the conventional circuit for simulating the far-end echo path illustrated in FIG. 3. A circuit for simulating the far-end echo path in accordance with the present invention is illustrated in FIG. 4. In FIG. 4 the far-end echo path is simulated by applying the pulse-shaping filters 51 to the quadrature and in-phase symbols a(k) and b(k). The symbols a(k) are then multiplied by $\cos (\omega_c + \omega_o)t$ using the multiplier 90 and the symbols b(k) are multiplied by $\sin (\omega_c + \omega_o)t$ using the multiplier 91. In this case $\omega_c/2\pi$ is the carrier frequency and $\omega_o/2\pi$ is the offset frequency which is adaptively determined using the phase lock loop circuit 92. The outputs of the multipliers 90 and 92 are summed using the summer 94 to generate a signal q(k) The signal q(k) is processed by a single linear transversal filter 100 with transfer function f(k). The coefficients of this linear transversal filter are determined adaptively using a Least Mean Square (LMS) algorithm. The output of the filter 100 is then estimated far-end echo signal $ê_f(k)$.

It should be noted that the filters 51 are contained in the transmitter as shown in FIG. 2. Thus, a far-end echo canceller (see element 30 of FIG. 1) can be implemented using two multipliers 90, 91, one summer 94, and a single linear transversal filter 100. This is far simpler than the conventional far-end echo canceller illustrated in FIG. 3.

The operation of the filter 100 may be understood in greater detail below. The estimated far-end echo signal $\hat{e}_f(k)$ is determined by the formula $$\hat{e}_f(k) = \sum_{i=0}^{n-1} f_i(k)q(k - i)$$

where $f_i(k)$, $i=0,1,\ldots n-1$ are coefficients of the linear transversal filter 100 and n is an integer indicating the number of such coefficients. The coefficients are determined according to the LMS algorithm as follows $$f_i(k + 1) = f_i(k) + \mu q(k - i)\left[y(k) - \sum_{i=0}^{n-1} f_i(k)q(k-i)\right]$$

where $\mu$ is a step size and y(k) is the signal on line 26 of FIG. 1.

Figure 5A:
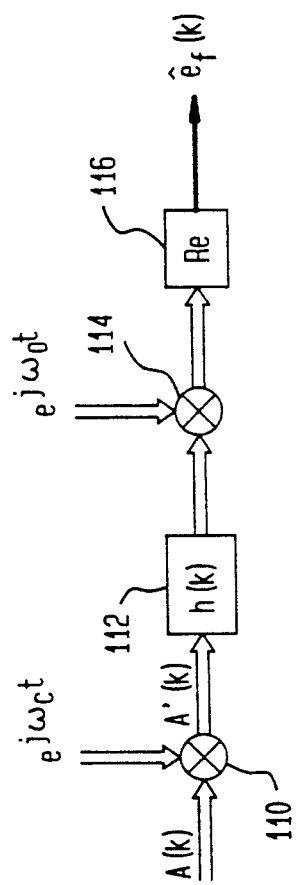
FIG. 5A and FIG. 5B explain the mathematical relationship between the echo cancellers of FIG. 3 and FIG. 4.
Figure 5B:
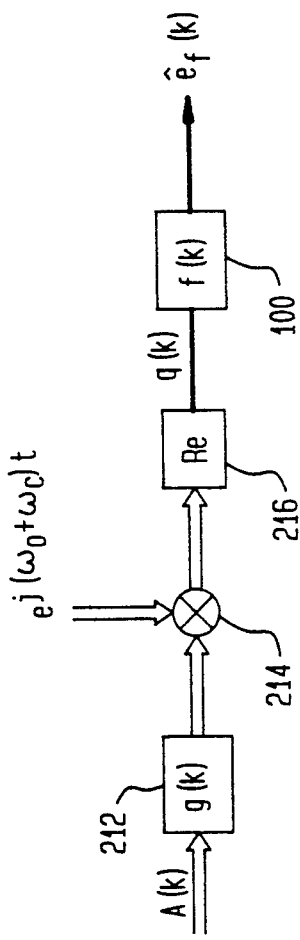

The mathematical relationship between the two ways to simulate the far-end echo path shown in FIG. 3 and FIG. 4 can be understood in connection with FIG. 5A and 5B. In FIG. 5A and 5B, double lined arrows represent complex quantities and single lined arrows represent real quantities.

The far-end echo path simulator circuit of FIG. 3 is redrawn in FIG. 5A. In FIG. 5 the rotator stage 60 of FIG. 3 is represented by the complex modulator 110 so that $A(k)=a(k)+jb(k)$, $A'(k)=a'(k)+jb'(k)$ and $A'(k)=A(k)e^{j\omega_c t}$. The transversal filter stage 70 of FIG. 3 is represented in FIG. 5A by the complex transversal filter 112 whose transfer function $h(k)=c(k)+jd(k)$. Similarly, the rotator stage 80 of FIG. 3 is represented by the complex modulator 114. To obtain the simulated far-end echo $\hat{e}_f(k)$, the real part of the output of the complex modulator 114 is obtained using the circuit 116 which corresponds to the summer 84 of FIG. 3.

The inventive far-end echo path simulation circuit is redrawn in FIG. 5B. The real filters 51 of FIG. 4 are represented in FIG. 5B by the complex filter 212 with the transfer function g(k). The multipliers 90 and 91 are represented by the complex modulator 214 and summer 94 is represented by the circuit 216 which takes the real part of the output of the complex modulator 214 to produce the signal q(k). As in FIG. 4, the signal q(k) is processed by the filter 100. The circuits of FIG. 5A and 5B generate the same output signal $\hat{e}_f(k)$ when the filter 100 has a transfer function f(k) such that $$f(k) = Re[F_a(k)e^{j\omega_c t}]$$

where $F_a(k)$ is the analytic part of F(k) and $$h(k) = [g(k) \, e^{j\omega_c t}F(k)].$$

The function h(k) is the transfer function of the complex filter 112 of FIG. 5A. The function F(k) relates the transfer function of the complex filter 112 to the transfer function of the real filter 100 of FIG. 5B.

In short, a far-end echo canceller for a system which utilizes QAM and which has frequency offset has been disclosed. The inventive far-end echo canceller is far simpler than conventional far-end echo cancellers for use in QAM systems with frequency offset. Finally, the above-described embodiments of the invention are intended to be illustrative only. Numerous alternative embodiments may be devised by those skilled in the art without departing from the spirit and scope of the following claims.

I claim:

1. A circuit for simulating a far-end echo path in a receiver of a communication system which utilizes Quadrature Amplitude Modulation to correct for frequency offset on a carrier frequency comprising
    pulse shaping filter means for filtering in-phase and quadrature data symbols,
    first and second multiplication means in communication with said pulse shaping filter means for multiplying said filtered in-phase and quadrature data symbols by $\cos(\omega_c+\omega_o)t$ and $\sin(\omega_c+\omega_o)t$, respectively, where $\omega_c$ is a carrier frequency and $\omega_o$ is a continuously variable offset frequency of said far-end echo path,
    summing means for summing the outputs of said first and second multiplication means, and
    a single real transversal filter in communication with said summing means, said transversal filter having a single real signal input and a real transfer function with adaptively determined coefficients for outputting a simulated far-end echo signal.

2. The circuit of claim 1 wherein said pulse shaping filter means has a raised cosine transfer function.

3. The circuit of claim 1 wherein said circuit includes means for adaptively determining said offset frequency $\omega_o$.

4. The circuit of claim 3 wherein said means for determining said offset frequency comprises a phase locked loop.

5. The circuit of claim 1 wherein said coefficients of the transfer function of said transversal filter are determined using an adaptive least mean square algorithm.

6. An echo canceller for use in a receiver in a communication system which utilizes Quadrature Amplitude Modulation to correct for frequency offset on a carrier frequency comprising
    multiplication means for receiving in-phase and quadrature data symbols after processing by a pulse shaping filter and for multiplying said filtered in-phase and quadrature data symbols by $\cos(\omega_c+\omega_o)t$ and $\sin(\omega_c+\omega_o)t$, respectively, where $\omega_c$ is a carrier frequency and $\omega_o$ is a continuously variable offset frequency of a far-end echo path of said communication system, to produce first and second multiplied signals,
    summing means for summing the first and second multiplied signals, and
    a single real transversal filter with a single real signal input and a real transfer function, having adaptively determined coefficients, in communication with said summing means for outputting a simulated far-end echo signal.

7. A method for simulating a far-end echo path in a receiver of a communications system which utilizes Quadrature Amplitude Modulation to correct for frequency offset on a carrier frequency comprising the steps of
    filtering in-phase and quadrature data symbols using pulse shaping filter means,
    after filtering by said pulse shaping filter means, multiplying said filtered in-phase and quadrature data symbols by $\cos(\omega_c+\omega_o)t$ and $\sin(\omega_c+\omega_o)t$, respectively, where $\omega_c$ is a carrier frequency and $\omega_o$ is a continuously variable offset frequency of said far-end echo path, to produce first and second multiplied signals,
    summing the first and second multiplied signals, and processing the summed signal with a single real filter having a single real signal input with a real transfer function, having adaptively determined coefficients, to obtain a simulated far-end echo signal.

8. A circuit for simulating a far-end echo path in a receiver of a communication system using Quadrature Amplitude Modulation to correct for frequency offset on a carrier frequency comprising:

a pulse shaping filter with transfer function g(k) for filtering complex data symbols A(k)=a(k)+jb(k), a modulator in communication with the pulse shaping filter for multiplying the data symbols output by the pulse shaping filter by $e^{j(\omega_c + \omega_0)t}$ where $\omega_c$ is a carrier frequency and $\omega_0$ is a continuously variable offset frequency of said far-end echo path, means for obtaining the real part of the modulator output signal, and a single real filter with a single real input signal and having a real transfer function with adaptively determined coefficients for filtering the real part of the multiplier output signal to output a simulated far-end echo signal.

* * * * *